United States Patent
Binning et al.

(10) Patent No.: US 7,526,277 B2
(45) Date of Patent: Apr. 28, 2009

(54) WIRELESS PAGING DIRECTORY ASSISTANT

(75) Inventors: Valerie Binning, Tucker, GA (US);
Barbara Gaines, Tucker, GA (US)

(73) Assignee: AT & T Intellectual Property I, L.P., Reno, NV (US)

( * ) Notice: Subject to any disclaimer, the term of this patent is extended or adjusted under 35 U.S.C. 154(b) by 227 days.

(21) Appl. No.: 10/183,706

(22) Filed: Jun. 25, 2002

(65) Prior Publication Data
US 2004/0214554 A1    Oct. 28, 2004

(51) Int. Cl.
*H04L 12/58* (2006.01)
*H04M 1/725* (2006.01)
*H04M 1/663* (2006.01)

(52) U.S. Cl. .............. 455/412.1; 455/412.2; 455/414.1; 455/414.2; 455/424

(58) Field of Classification Search .............. 455/412.1, 455/412.2, 414.1, 414.2, 424
See application file for complete search history.

(56) References Cited

U.S. PATENT DOCUMENTS

| | | | |
|---|---|---|---|
| 6,286,013 B1 * | 9/2001 | Reynolds et al. | 707/200 |
| 6,427,009 B1 * | 7/2002 | Reese | 379/215.01 |
| 2002/0049751 A1 * | 4/2002 | Chen et al. | 707/3 |
| 2002/0068551 A1 * | 6/2002 | Strunk et al. | 455/414 |
| 2002/0131573 A1 * | 9/2002 | Berkley et al. | 379/201.01 |
| 2003/0167282 A1 * | 9/2003 | Nance | 707/104.1 |

* cited by examiner

*Primary Examiner*—Alexander Eisen
*Assistant Examiner*—Matthew W Genack
(74) *Attorney, Agent, or Firm*—Parks Knowlton LLC; Paul Knowlton, Esq.

(57) ABSTRACT

An online directory system that provides relatively comprehensive and up-to-date information relating to users and their corresponding cellular telephone numbers and/or wireless pager numbers. The system and method involves a cellular telephone database and a means for providing access to the cellular telephone database. Users provide search requests through the means of communication and the search is carried out providing results to the requesting party. The search request typically includes a name and the results typically include a list of one or more names and corresponding cellular telephone numbers satisfying the search request.

20 Claims, 6 Drawing Sheets

WIRELESS PAGING DIRECTORY ASSISTANT

FIELD OF THE INVENTION

This invention relates to the field of telecommunications, and in particular the use of telecommunications to provide online directory assistance. More particularly still, the present invention relates to an online directory assistance system for cellular telephone numbers.

BACKGROUND OF THE INVENTION

Cellular telephones provide users with significant mobility and freedom and are becoming a preferred means of communication between individuals. Indeed, given the popularity of such telephones, the service providers for these cellular telephones vigorously compete for users. As a direct result, many companies continuously provide new and better cellular telephones, service options, or the like, in order to entice more people to purchase their products. Consequently, users frequently switch from one service provider to another, typically to capitalize on better services. Unfortunately however, when users change providers, a new telephone number is typically assigned.

The frequent switching of cellular telephone providers, therefore, has created a relatively unique problem in providing up-to-date directory assistance for cellular telephone numbers. It is well understood that in order to initiate a telephone call to a cellular telephone, the initiating party typically must have the telephone number of the other party. It is also well known that many publishers provide printed directories of telephone numbers. These telephone books are printed on a periodic basis and attempt to provide comprehensive, up-to-date listings of telephone numbers and their corresponding users. Unfortunately, however, since the cellular telephone numbers change so frequently, the publishers of the printed telephone directors typically do not print cellular telephone number directories.

It is with respect to these and other considerations that the present invention has been made.

SUMMARY OF THE INVENTION

The present invention relates to an online directory system that provides relatively comprehensive and up-to-date information relating to users and their corresponding cellular telephone numbers and/or wireless pager numbers. The system and method involves a cellular telephone database and a means for providing access to the cellular telephone database. Users provide search requests through the means of communication and the search is carried out providing results to the requesting party. The search request typically includes a name and the results typically include a list of one or more names and corresponding cellular telephone numbers satisfying the search request.

In accordance with certain aspects, the present invention relates to a system and method of providing online, cellular telephone assistance wherein a user can access an online database of cellular telephone numbers, provide one or more search terms and receive at least one cellular telephone number in response to the search request. In an embodiment, the cellular telephone number may relate to pagers as well as telephones. The online database is updated periodically, and in one embodiment, the database is updated automatically, such as when the service provider telephone number database is modified. Search terms may include names, first and last, geographic information, such as addresses, cities or regions, the service provider, etc. In accordance with other aspects, the present invention relates to the automatic redaction of certain information from being accessible in the online database, either whole records or portions thereof.

The invention may be implemented as a computer process, a computing system or as an article of manufacture, such as a computer program product. The computer program product may be a computer storage medium readable by a computer system and encoding a computer program of instructions for executing a computer process.

A more complete appreciation of the present invention and its improvements can be obtained by reference to the accompanying drawings, which are briefly summarized below, to the following detailed description of presently preferred embodiments of the invention and to the appended claims.

DETAILED DESCRIPTION OF THE PRESENT INVENTION

Figure 1:
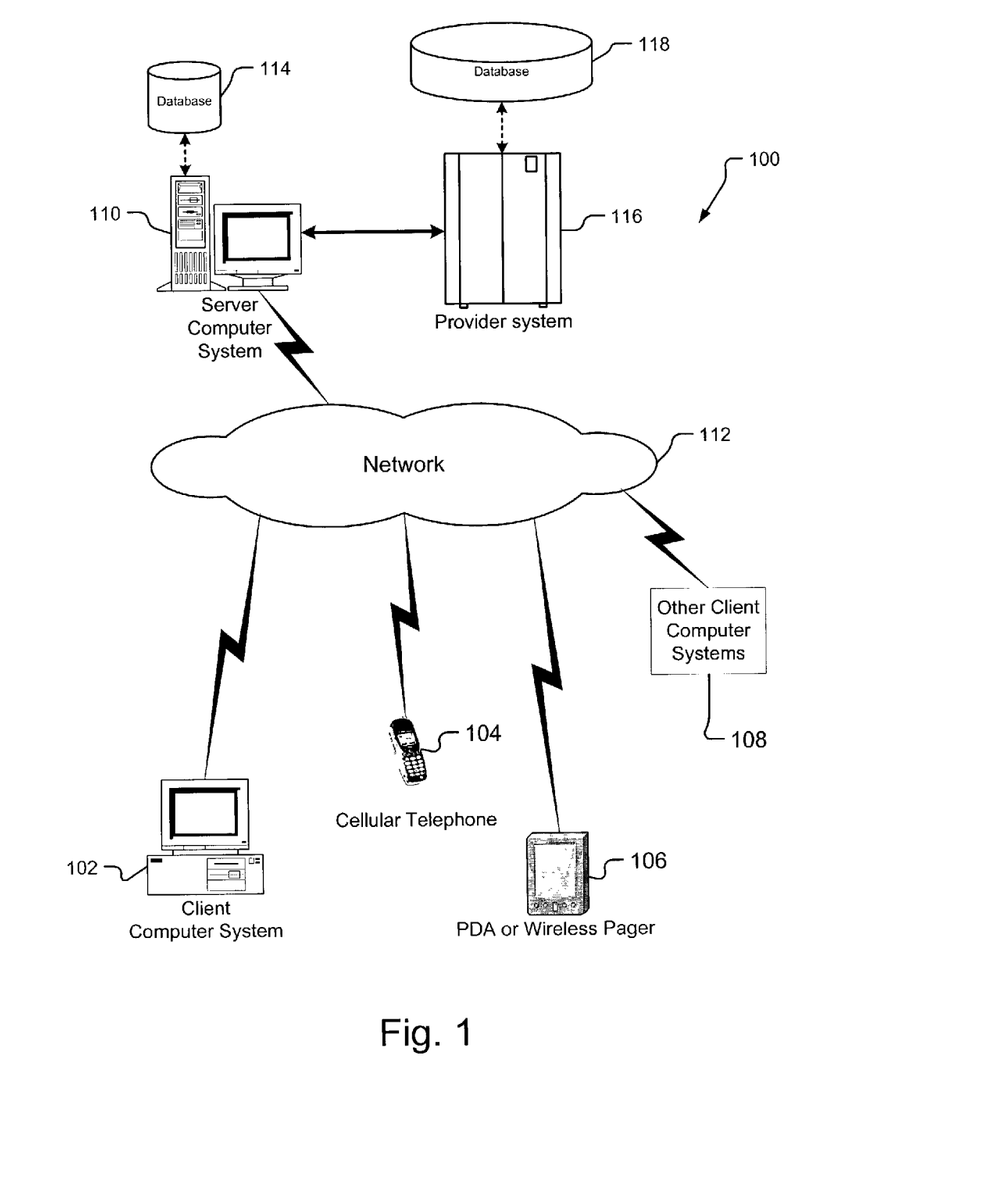
FIG. 1 illustrates a distributed network system that incorporates aspects of the present invention.

A distributed environment 100 incorporating aspects of the present invention is shown in FIG. 1. The environment 100 has at least one client computer system 102 and potentially other client computer systems 104, 106 and 108. The environment 100 may further include a server computer system 110 that communicates with the client computer systems 102, 104, 106, and 108. The server computer system 110 communicates with the client computer system(s) by a network 112 to provide cellular telephone numbers in response to a request for such numbers. The server computer system 110 maintains a database 114 of such cellular telephone numbers in order to provide this type of response. The server computer system 110 may further provide searching or filtering capabilities in association with providing cell phone numbers. Additionally, the server computer system 110 may communicate with provider system 116, wherein the provider system 116 maintains a more extensive database 118 of cell phone numbers and other user information. In one embodiment, the provider system 116 and corresponding database 118 relate to the actual service provider for cell phone users and the database 118, therefore, is the database that maintains all cell phone user information, including names, addresses, billing information, etc.

In an embodiment, the computer system 102 is a desktop-type computer system that communicates with the server 110 over network 112 wherein the network 112 is the Internet or some other communication system. In another embodiment, other client computer systems 104, 106, and 108 may also communicate with the server over the Internet 112. In one embodiment, cell phone 104 and/or pager 106 may communicate with a server 110 over a separate or different type of network system. For example, the cellular telephone or pager may communicate via radio stations and mobile switching centers. These mobile switching centers may further be connected to network servers that can provide information to the cellular telephone and/or pager.

Additionally, the cellular telephone 104 and/or pager 106 may communicate with a public switch telephone network through the MCS. Such a connection thereby allows communication between the cellular telephone and/or pager and a conventional telephone. In this manner the cellular telephone and/or pager may further connect to an Internet service provider to further provide an actual Internet connection to an Internet server, such as server 110. It should be noted, however, that server 110 may communicate with or otherwise be connected to these client computer systems in other manners recognized by those skilled in the art. In yet another embodiment, the client computer system 108 may be any other communication system or device capable of sending and receiving data to and from a network communication system 112.

The server computer system 110 maintains a database 114 of cellular telephone numbers and/or pager numbers. In alternative embodiments the server may further include other numbers, such as wire line values, Internet domain names, business addresses, personal addresses, business phone numbers, etc. Similarly, each of these numbers or values is associated with the actual name or some other identifier that may be used as a search term.

The server further communicates with the provider 116. The provider 116 maintains the cell phone numbers in combination with their associated names or search terms. The repository may relate to a cell phone provider service that keeps track of all the names and phone numbers.

Figure 2:
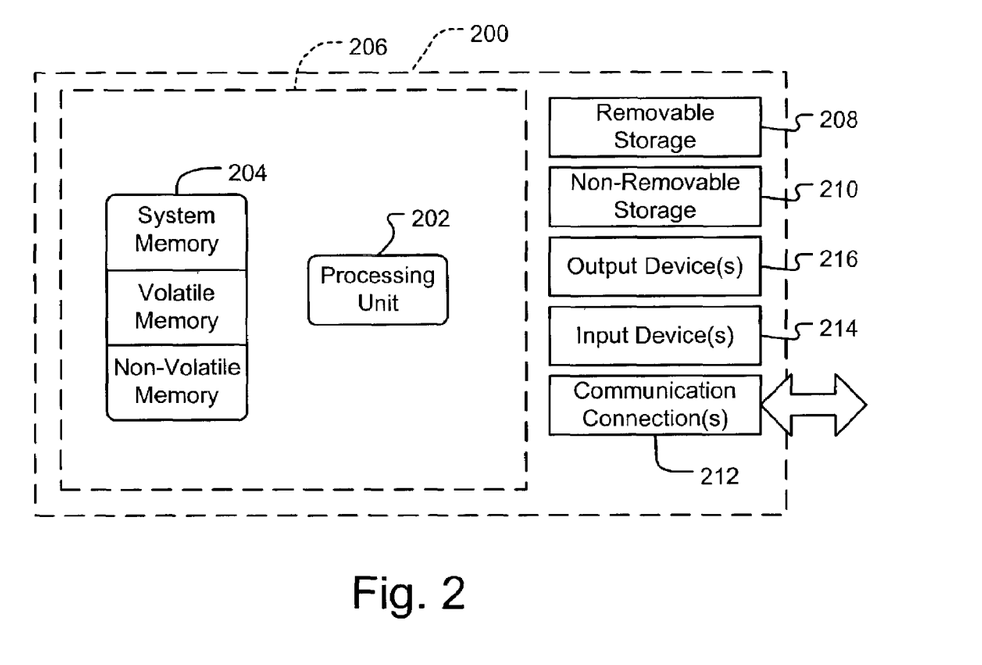
FIG. 2 illustrates a computer system that may be used according to particular aspects of the present invention.

The computer systems 102, 104, 106, 108, 110 and 116 may be represented by the computer system 200 shown in FIG. 2. The system 200 has at least one processor 202 and a memory 204. In its most basic configuration, computing system 200 is illustrated in FIG. 2 by dashed line 206 encompassing the processor 202 and the memory 204. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media, such as memory 204, removable storage 208 or non-removable storage 210 includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media.

Figure 3:
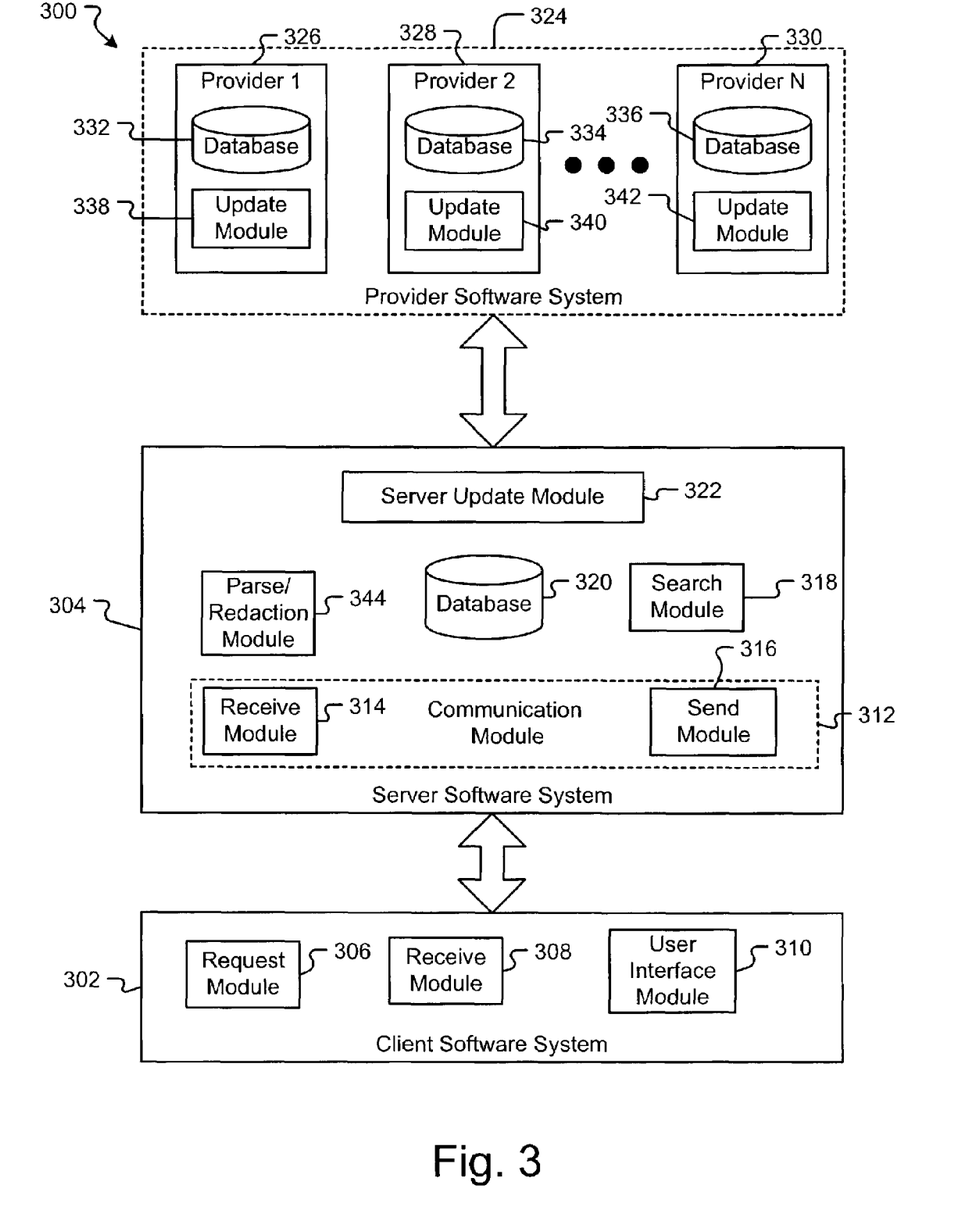
FIG. 3 is a block diagram illustrating functional components of the system shown in FIG. 1 incorporating aspects of the present invention.

FIG. 3 illustrates a software/hardware environment 300 incorporating aspects of the present invention. The environment 300 includes separate modules that perform functional operations in accordance with those aspects. In general, the environment 300 comprises a client computer system or layer of software 302 and a server computer system or layer of software 304, which, in one embodiment correspond respectively to client computer system 102 and server computer system 110 shown in FIG. 1. The client layer 302 communicates with the server layer 304 in order to retrieve cellular telephone numbers. To that end, the client layer 302 has a request module 306 that is used to request information from the server layer 304. The client layer also has a receive module 308 that receives information from the server layer 304. The client layer may further include a user interface module 310 that is used to interface with the user to provide results back to the user and receive search requests from the user. The client layer 302 may include many other modules, such as input and output control modules, used in the course of processing and computing functions. Such other modules are well known in the art and need not be discussed in detail here.

The server layer 304 has a communication module 312 that communicates with the client layer 302. The communication module 312 may include a server receive module 314 for receiving search requests from the client layer 302, and in particular, the request module 306. The communication module 312 may further include a send module 316 designed to package and send search results back to the client layer 302, and in particular, to the client receive module 308.

The server software system 304 incorporates a search module 318 which is used to search a database 320 of cellular telephone numbers and other information. In operation, the communication module 312 provides a search request to search module 318. Typically, the search request includes the name or some other identifying information for a particular cellular telephone user. The search module 318 uses this information to locate the particular phone number or set of phone numbers satisfying the search request. Upon locating the one or more numbers, the search module provides the communication module 312 with the results for delivery back to the client system 302. The search module 318 may comprise or use many different modules or sub-modules in order to execute the actual search and it is contemplated that many different search routines may be used in order to perform this function in accordance with the present invention. Additionally, although only one database 320 is shown in FIG. 3, other embodiments may incorporate more than one database 320 in order to implement storing of the phone numbers. In such a case, the search module 318 searches all the necessary databases to provide meaningful search results.

In accordance with aspects of the present invention, the database 320 is frequently updated in order to provide meaningful search results in the ever-changing domain of cellular telephone numbers. In order to achieve such meaningful results, the server layer 304 further includes a server update module 322 that communicates with a provider layer 324. The provider layer 324 has one or more provider modules, such as provider 1 module 326, provider 2 module 328 and provider N module 330. Each provider module 326, 328 and 330 relates to a service provider that maintains information for each cellular telephone account, such as the cellular telephone number, the name of the user, among other items. In order to store such information, each provider has a database, such as databases 332, 334 and 336, respectively. The cell phone number repositories or databases 332, 334 and 336 are updated by the provider itself as new cell phones become active or deactivated.

In one embodiment, the server update module 322 communicates requests to the provider layer 324 to update the database 320. The provider modules 326, 328 and 330 may then provide comprehensive and up-do-date information of existing cell phone numbers and their respective users to the server layer 304. In another embodiment, each provider, 326, 328 and 330 has an update module, such as update modules 338, 340 and 342, respectively. These update modules recognize when a change has been made to their respective database and transmit the updated information to the server update module automatically. Alternatively, the entire database of information may be transmitted upon a change. Frequently requesting updates, or frequently receiving the updates, whether based on time interval, e.g., every 10 minutes, or based on an event, e.g., new number activated by a service provider, provides a relatively up-to-date database 320 of cellular telephone numbers that may be accessed by client systems, such as system 302.

As information is received from the provider software system 324, a parse/redaction module 344 may be used to parse the received information and store required records and fields into database 320. The parse module 344 may elect to store only some of the information received, e.g., last names and associated telephone numbers only, or first and last names with associated telephone numbers, etc. The parse module 344 may further format the information in a consistent manner to aid the search module in searching the relative records and fields. Additionally, the parse module may be designed to allow for redaction of some predetermined cellular telephone numbers. In essence, the server layer 304 may have a list of some individuals that have requested to not list their cellular telephone numbers for one reason or another. In such a case, the parse/redaction module 344 may use this information to redact those numbers from being listed in the database 320. Alternatively, such redaction process may occur at the provider modules 326, 328 and/or 330.

Figure 4:
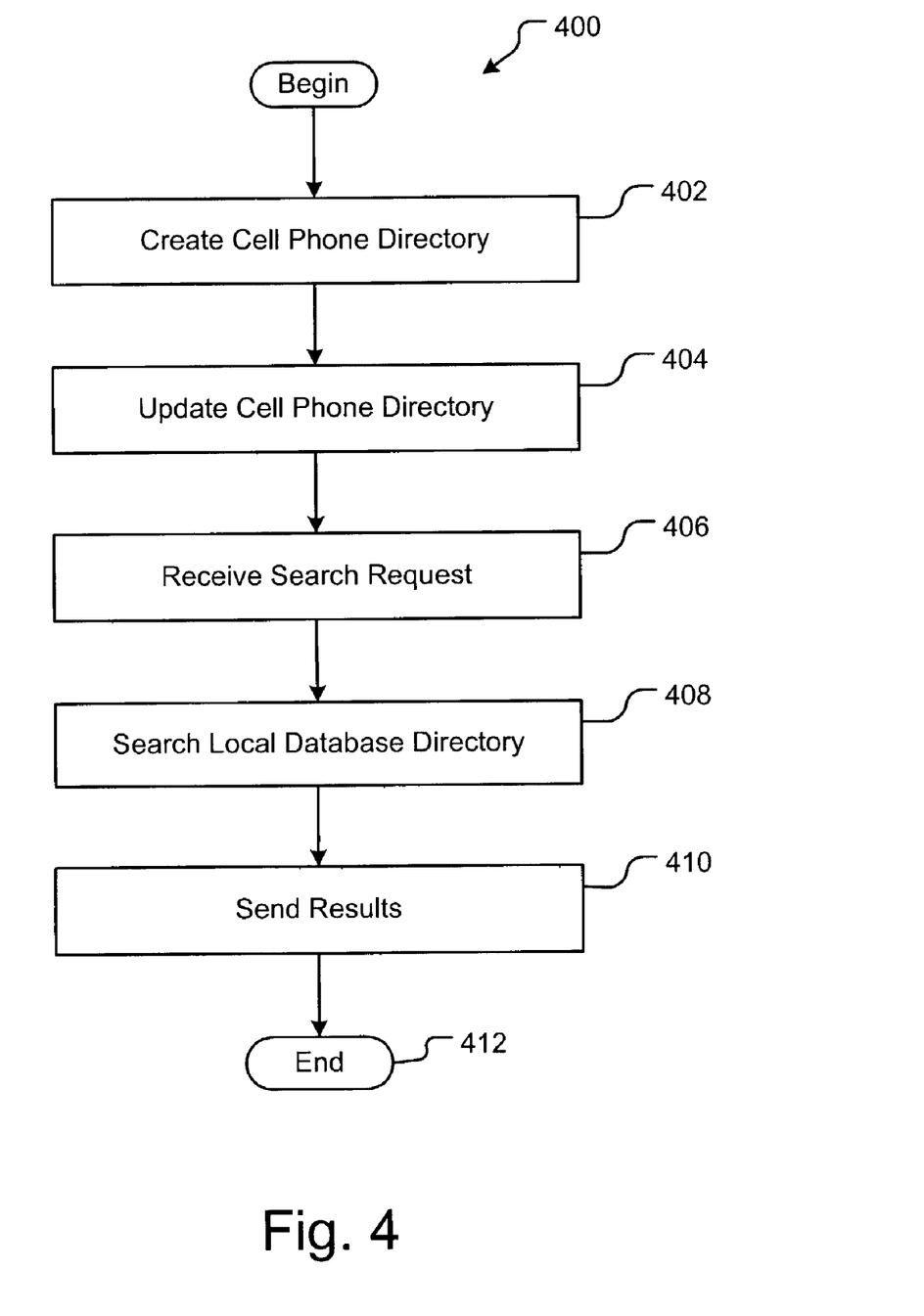
FIG. 4 illustrates a flowchart of functional operations related to the server-side operations in creating a cellular telephone database such as the database depicted in FIG. 3 and responding to requests from a client, in accordance with an embodiment of the invention.

FIG. 4 illustrates the functional components related to server-side operation, such as server 110 shown in FIG. 1, for creating a cellular telephone database and responding to requests from one or more clients for a particular number. Initially, flow 400 begins with create operation 402. Create operation 402 creates a cellular telephone directory database, such as database 320 shown in FIG. 3. Create operation involves the culling of cellular telephone numbers and associated user names. In other embodiments, other numbers, such as pager numbers may also be included in the creation of the database. Creation of the cellular telephone directory may be performed in many ways, such as requesting all existing cellular telephone numbers from all existing cellular telephone providers and their respective services. Once all this information is requested and received the information is then stored in a database that is searchable.

Following create operation 402, update operation 404 updates the database created in operation 402. Update operation 404 may be initiated in response to numerous, alternative events, such as the expiration of a predetermined time interval, e.g., every 10 minutes. Alternatively, the initiating event may be a change in the provider's database. In such a case, the updates are more "real time" in that a connection with the cellular telephone system providers allows cellular telephone updates when changes are made to the provider's system(s). In essence, as soon as a number is activated or deactivated in this embodiment, an update signal is provided to the server system initiating the update process. The update process may involve simply modifying the relevant entries or a complete deletion of the first set of information and replacement with the new information.

Following update operation 404, receive operation 406 receives the search request from a client computer system, such as systems 102, 104, 106, and 108, as shown in FIG. 1. In an embodiment, the search request includes information indicating that the request is a search for one or more cellular telephone numbers and at least one identifying search term. The search term may be associated with one or more cell phone numbers. Exemplary search terms may include but are not limited to, last names, cities, addresses, first names, service providers, etc. In an embodiment, only one search term may be provided, but alternative embodiments allow more than one search term. Additionally, some embodiments may allow for wildcards or other control characters indicating search parameters, e.g., an asterisk may indicate that a search should collect all records satisfying the letters preceding the asterisk, ignoring those following the asterisk.

Following receive operation 406, search operation 408 searches the database for the search term. Upon locating one or more search terms that satisfy the search request, the results are packaged for delivery to the client. I.e., upon locating the results, send operation 410 sends the results back to the requester. In an embodiment, the results may be a list of one or more names of users and their corresponding cellular telephone numbers. Additionally, the requestor may then select one of the names and numbers and dial that user, as discussed below in conjunction with FIG. 5.

Figure 5:
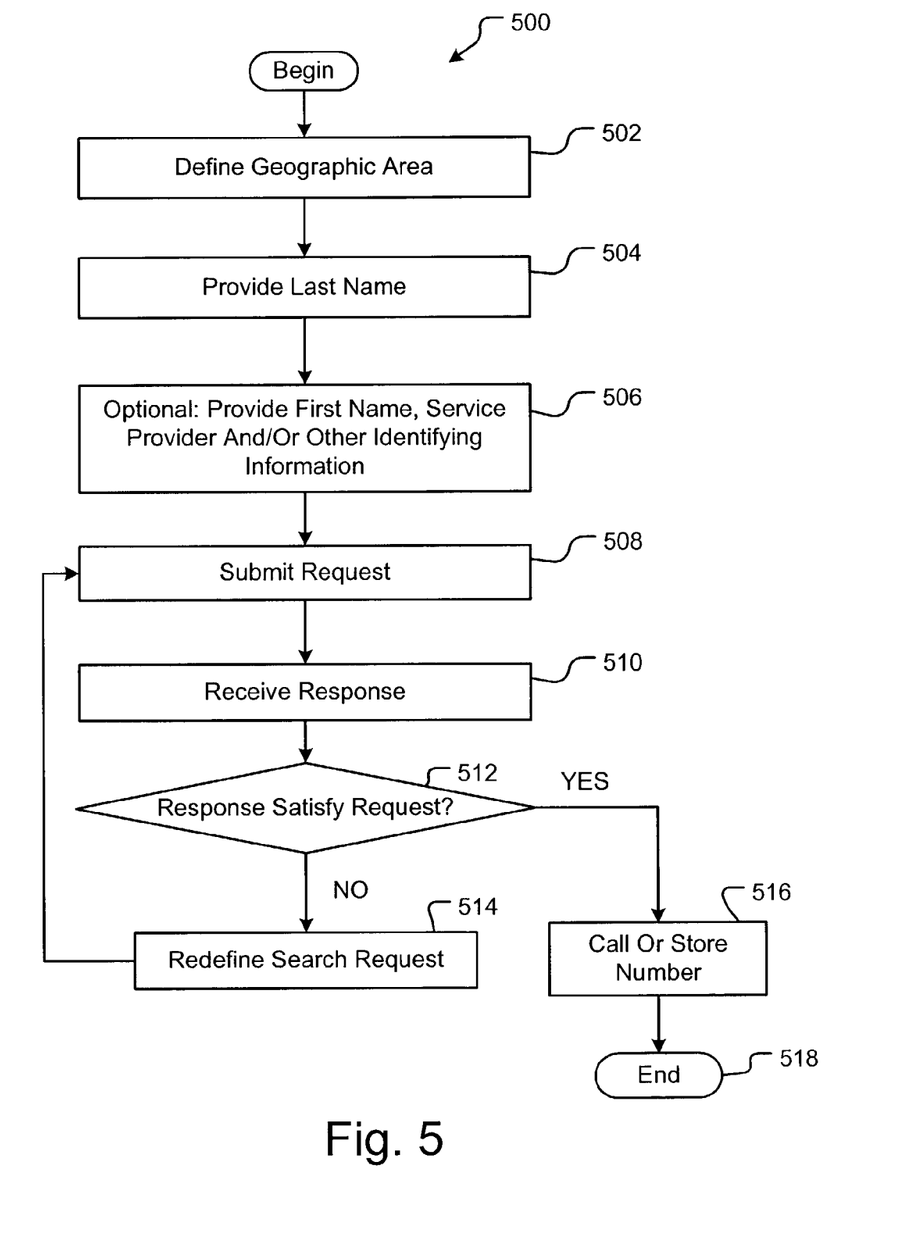
FIG. 5 illustrates a flowchart of functional operations related to client-side operations in sending a request for a cellular telephone number to a server, such as the server computer system shown in FIG. 1, in accordance with a particular embodiment of the invention.

FIG. 5 illustrates the functional components related to client-side operation, such as client 102 shown in FIG. 1, for requesting a cellular telephone number. Initially, flow 500 begins with define operation 502. Define operation 502 defines a geographic region relating to telephone numbers. Define operation 502 may involve user input relating to which city or which geographic region the cell phone user is located. In alternative embodiments, define operation 502 may involve selecting an area code or another geographic region identifier.

Following define operation 502, provide operation 504 provides the last name of the cellular telephone user. In most embodiments, the last name of the user is the primary search term in locating the proper cellular telephone number. Consequently, the database used to store the numbers with associated search terms typically has been pre-sorted, alphabetically, on last names to improve the search process. Moreover, in some embodiments, the last name may be a required search term. Alternative embodiments may require other items in addition to the last name or in place of the last name. Upon selecting or providing the last name, an optional provide operation 506 may be preformed. Optional provide operation 506 may provide other identifying search terms, such as first name, address, etc. These items may also be used to further define the search.

Upon providing the requisite search terms, submit operation 508 submits the request to the server. Submit operation 508 involves communication, such as over the Internet, of the request to the proper server. Upon receiving the request, the server searches the database and returns the search results to the client. Hence, receive operation 510 receives the search results from the server.

As the results are received, determine operation 512 determines whether the results satisfy the request. Determine operation may involve the user identifying whether the proper set of results was returned, or more specifically, whether the desired cellular telephone number was included in the search results. Alternatively, the user may determine that the results returned from the search were too many such that the proper cellular number could not be determined without too much effort. If the response does not satisfy the request for this reason or any other reason, flow 500 branches NO to redefine operation 514.

Redefine operation 514 redefines the search request, such as by changing the search terms or by adding more search terms. Upon redefining the search, submit operation 508 submits the new search to the server.

On the other hand, if the response satisfies the request, then flow branches YES to call or store operation 516. Call or store operation 516 relates to the user either calling the requested and received telephone number, or storing that number in the user's personal database for later recall. Of course other operations may be preformed in place of operation 516, i.e., the user is not required to call the telephone number or store the number. Upon completion of call or store operation 516, flow ends at end operation 518.

Figure 6:
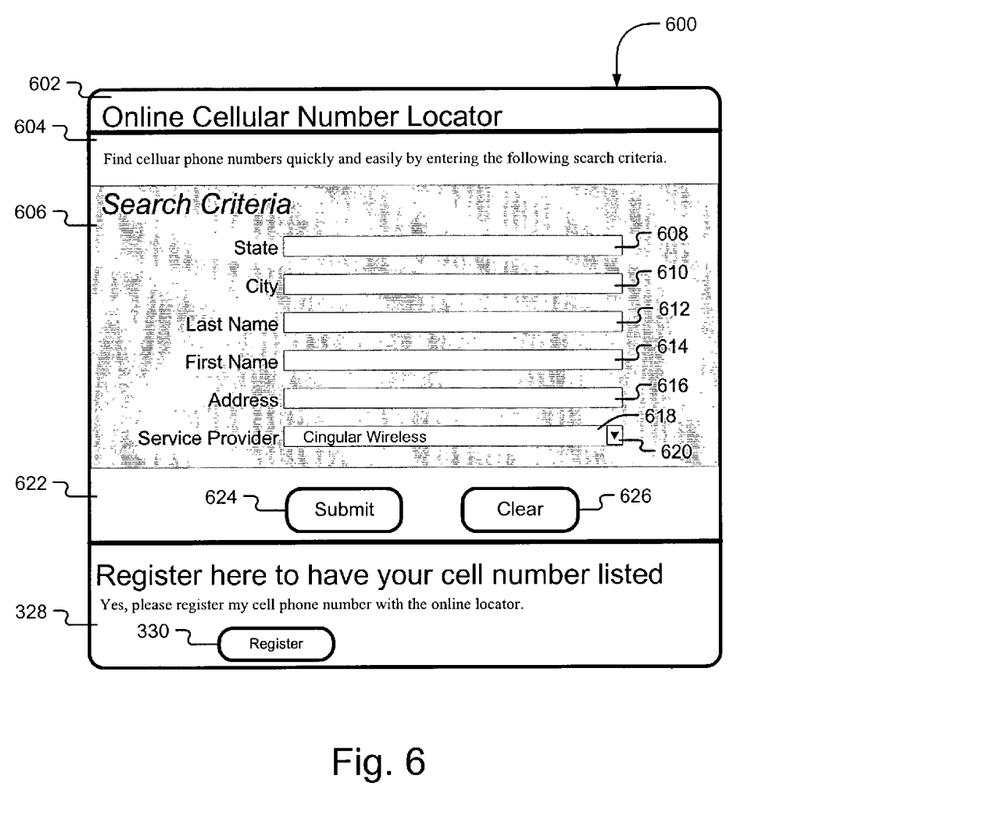
FIG. 6 illustrates a sample graphical user interface screenshot that may be implemented in order to allow a user to search and retrieve a cellular telephone number.

FIG. 6 illustrates a sample graphical user interface screenshot 600 that may be implemented in order to allow a user to search and retrieve a cellular telephone number in accordance with the present invention. The screenshot 600 may be presented to the user on a client system such as systems 102, 104, 106 and/or 108 (FIG. 1). As such, the user interface for the client system typically can display such information. However, some client systems, such as the cellular telephone 104, may have a more limited area to display such information such that the screenshot 600 may be modified to account for the limited area.

As shown the display 600 has a title area 602 that displays a title for the screenshot. In this example, the title is "Online Cellular Number Locator." Other embodiments may use other titles, but in general, the title provides the user the necessary information to indicate the present user-interface display. Also as shown, an optional information area 604 may be provided to give the user information on the intended use of the display 600 and its functionality. For example, instructions may be provided in the area 604.

The screenshot 600 also has a user entry area 606 for entering search information. The information is then used by the system, e.g., client system 102, to package a search request including the proper search terms. Many different embodiments may be created that identify any number of different, potential search terms. The example shown in FIG. 6 identifies a few such terms. For instance, the screenshot has text-entry boxes 608 and 610 for entering State and City information. Such information eventually helps the server system, such as server 110 narrow the search results. Moreover, since most requesting users know this information, such an entry is not overly burdensome.

Display 600 also provides boxes 612, 614 and 616 for entering, as search terms, the last name, first name and address, respectively, associated with the cellular telephone number requested. In many cases only the last name is required. However, when the user provides more information, the results tend to be more relevant since the server can narrow the results. Yet, in other situations, too many search terms may prevent the server from locating the proper record, especially if one of the entries is incorrect for some reason. Consequently, it is foreseeable that users may begin by entering one or two search terms (such as the state and last name) and, depending on the results, narrow the search by entering more terms (such as first name, city and/or the address).

In a particular embodiment, the display 600 may further include an optional search term entry area 618 for entering the service provider, such providers 326, 328 and 330. The service provider may then give more information in narrowing the search for the proper telephone number. Alternatively, this information may be used by the server to request more information from the proper provider. The display may further include a drop-down control 620 providing the user the ability to display and then select from a list of potential or known providers, such as "Cingular Wireless" service provider.

The display 600 further includes a control portion 622 that has controls for submitting the request, i.e., submit button 624 or to clear the information, such as through clear button 626. Of course other controls (not shown), e.g., "exit," "go back," etc., may also be implemented and displayed in display 600.

Optionally, the display 600 may have an additional function region 328 for registering new users. The region 328 provides a register button 330 that, when selected, provides the user with a form to register their cellular phone number on the system. Region 328 is optional but may provide significant benefits in getting new numbers listed on the server.

It will be clear that the present invention is well adapted to attain the ends and advantages mentioned as well as those inherent therein. While a presently preferred embodiment has been described for purposes of this disclosure, various changes and modifications may be made which are well within the scope of the invention. Numerous other changes may be made which will readily suggest themselves to those skilled in the art and which are encompassed in the spirit of the invention disclosed and as defined in the appended claims.

What is claimed is:

1. A method of locating a cellular telephone number for a user, the method comprising:

accessing an online database of cellular telephone numbers, wherein the database is modified automatically upon receipt of an update from a service-provider in response to at least one of: a modification of an existing service-provider cellular telephone number database and a request from the online database;

providing a search request, wherein the search request has one or more search terms, the search request comprising at least one search parameter, the at least one search parameter indicating that the search collect all records in the database satisfying one or more characters in the one or more search terms preceding a wildcard character and ignore records in the database satisfying one or more characters in the one or more search terms following the wildcard character; and receiving at least one cellular telephone number in response to the search, wherein the at least one cellular telephone number is not received when the database is instructed to redact the cellular telephone number, wherein instructing the database to redact the cellular telephone number comprises using information contained in a list of individuals that have requested to not list their cellular telephone number to determine the cellular telephone number is to be redacted, wherein the information contained in the list comprises a reason why the cellular telephone number has been requested to be redacted.

2. The method as defined in claim 1 wherein the cellular telephone number relates to a wireless pager number.

3. The method as defined in claim 1, wherein the automatic update is further received in response to expiration of a predetermined time interval.

4. The method as defined in claim 1, wherein the automatic modification of the database in response to the received update includes one of updating only the modified cellular phone numbers and updating the entire database.

5. The method as defined in claim 1 wherein the automatic service-provider-initiated directory update transmits identifying redaction information.

6. The method as defined in claim 1 wherein the service-provider-initiated directory update redacts private information.

7. The method as defined in claim 1 wherein at least one search term includes a geographic region.

8. The method as defined in claim 1 wherein the user stores the received cellular telephone number in memory located locally.

9. A computer readable medium having computer-executable instructions stored thereon for performing a method comprising:
   accessing an online database of cellular telephone numbers, wherein the database is modified automatically upon receipt of an update from a service-provider in response to at least one of: a modification of an existing service-provider cellular telephone number database and a request from the online database;
   providing a search request, wherein the search request has one or more search terms, the search request comprising at least one search parameter, the at least one search parameter indicating that the search collect all records in the database satisfying one or more characters in the one or more search terms preceding a wildcard character and ignore records in the database satisfying one or more characters in the one or more search terms following the wildcard character; and
   receiving at least one cellular telephone number in response to the search, wherein the at least one cellular telephone number is not received when the database is instructed to redact the cellular telephone number, wherein instructing the database to redact the cellular telephone number comprises using information contained in a list of individuals that have requested to not list their cellular telephone number to determine the cellular telephone number is to be redacted, wherein the information contained in the list comprises a reason why the cellular telephone number has been requested to be redacted.

10. The computer readable medium of claim 9, wherein the automatic service-provider-initiated directory update transmits identifying redaction information.

11. The computer readable medium of claim 9, wherein the automatic update is farther received in response to expiration of a predetermined time interval.

12. A computer system for providing one or more cellular telephone numbers in response to a received request, the system comprising:
   a database for storing cellular telephone numbers;
   a receive module for: receiving the request, the request having at least one search term;
   a search module for searching the database using at least one search term in the search request, the search request comprising at least one search parameter, the at least one search parameter indicating that the search collect all records in the database satisfying one or more characters in the at least one search term which precede a wildcard character and ignore records in the database satisfying one or more characters in the at least one search term which follow the wildcard character;
   a server update module, for receiving updated information from a service provider, wherein the updated information is provided in response to at least one of: a modification of an existing service-provider cellular telephone number database and a request from the server update module; and
   a parse module for redacting one or more predetermined cellular telephone numbers stored in the database, wherein redacting the cellular telephone numbers stored in the database comprises using information contained in a list of individuals that have requested to not list their cellular telephone number to determine the cellular telephone number is to be redacted, wherein the information contained in the list comprises a reason why the cellular telephone number has been requested to be redacted.

13. The computer system as defined in claim 12, wherein the server update module is further configured to update the database automatically upon receiving updated information.

14. The computer system as defined in claim 13, wherein the updated information is provided by the service-provider in response to expiration of a predetermined time interval.

15. The computer system as defined in claim 13, wherein the server update module is further configured to modify one of only the modified cellular phone numbers in the database and the entire database in response to receiving the updated information.

16. The computer system as defined in claim 13 wherein the server update module communicates with a plurality of service providers.

17. The computer system as defined in claim 13 wherein the automatic service-provider-initiated update redacts private information.

18. The computer readable medium of claim 9, wherein the service-provider-initiated directory update act redacts private information.

19. A computer system as defined in claim 13 wherein the automatic service-provider-initiated update transmits identifying redaction information.

20. A computer readable medium of claim 9, wherein the automatic modification of the database in response to the received update includes one of updating only the modified cellular phone numbers and updating the entire database.

* * * * *